UNITED STATES PATENT OFFICE.

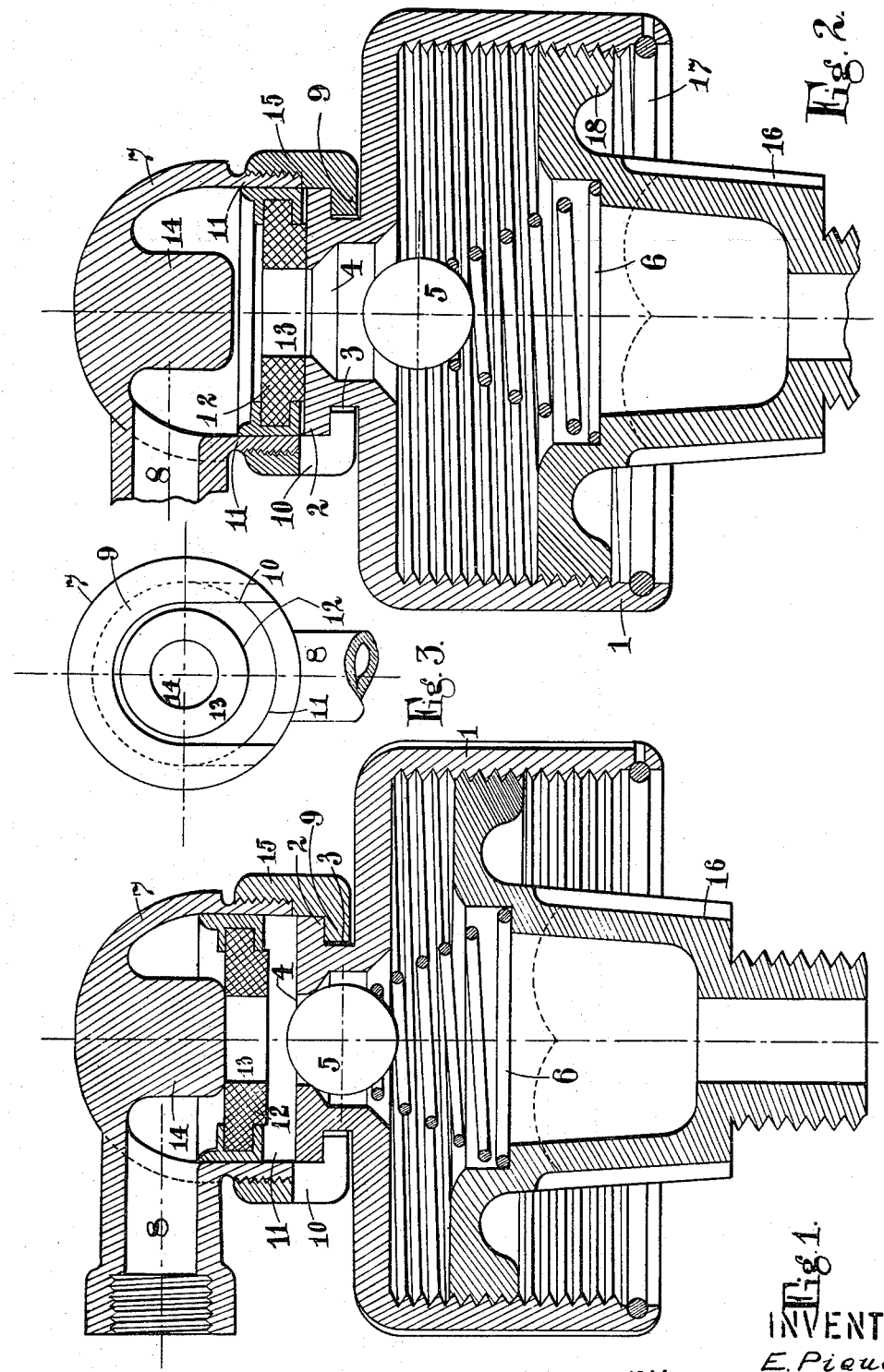

EMILE PIQUEREZ, OF ST.-URSANNE, SWITZERLAND.

LUBRICATOR.

1,276,108.  Specification of Letters Patent.  Patented Aug. 20, 1918.

Application filed March 15, 1918. Serial No. 222,542.

*To all whom it may concern:*

Be it known that I, EMILE PIQUEREZ, a citizen of the Swiss Republic, residing at Fabrique Thekla, St.-Ursanne, Switzerland, have invented certain new and useful Improvements in Lubricators, of which the following is a specification.

Lubricators of the hand operated force feed type are known, which have a special orifice for charging them, so that in effecting such charging it is not necessary to unscrew the cover completely from the lubricator body. Nevertheless such lubricators are not constructed for containing grease or a lubricant of semi-solid consistency because up to the present, all attempts to construct such lubricators in such a manner as to allow of introducing the lubricant through an orifice provided for this purpose in the cover, have failed owing to the loss of lubricant which counterbalances the advantages of keeping the lubricant clean and of rapidity in charging that are obtained.

The object of the present inventor has been to produce a lubricator provided with a device which will allow of charging the lubricator with a semi-solid lubricant without loss through a hole provided for this purpose.

The present invention has now for its object to provide an improved lubricator of the hand operated force feed type for a semi-solid lubricant, formed with a charging orifice for the introduction of the lubricant, and characterized by the novel feature that it comprises mounted on a flange arranged concentrically to the charging orifice, a charging device consisting of a hood in which a perforated piston is adapted to work, the whole being so constructed and arranged that in the charging operation, the piston is caused to free its orifice or perforation so as to allow the lubricant to pass through.

The manner in which this invention is to be performed will now be more particularly described with reference to the accompanying drawings which illustrate by way of example a constructional form of a lubricator according to the present invention.

In these drawings:

Figure 1 is a central longitudinal section showing the lubricator closed.

Fig. 2 is a similar section showing the lubricator open for charging.

Fig. 3 is an underside view of the coupling member with the hood and perforated piston contained therein.

In the example shown, the cover 1 of the lubricator is formed with a flange 2 that is concentric to the charging orifice 4. The orifice 4 is normally closed by a ball 5. 6 is a spring having a constant tendency to press the ball 5 against its seat so as to close the charging orifice 4. A hood 7 formed with a tubular union 8, is adapted to fit and be connected to the flange 2. The connection is effected by means of a coupling member 15 shown in underside view in Fig. 3. This coupling member has a tongue 9 designed to engage in the annular groove 3 formed between the flange and the cover.

The hood is fitted on to the lubricator by inserting the flange 2 through the gap 10.

The hood 7 is formed with a cylindrical portion 11 in which a piston 12 perforated with an orifice 13 is adapted to work. This orifice 13 is closed by a plug 14 when the piston 12 is in its outermost position.

The cover 1 is provided with an outwardly expanding spring 17 which is engaged in an annular groove and by bearing against the screw-threaded portion 18 of the lubricator foot 16, prevents the cover 1 from being completely unscrewed from the lubricator.

The charging of the lubricator is effected in the following manner:

The positions of the various parts when at rest are shown in Fig. 1. The tubular union 8 is adapted to be connected to a syringe filled with lubricant. When the hood 7 has been fixed upon the flange 2, after having unscrewed the cover as far up as possible, the lubricant is injected into the charging device under pressure. This pressure causes the piston 12 to move down and thus uncover its orifice so as to allow the lubricant being charged to pass through and act upon the ball 5 which being thereby forced away from its seat allows the lubricant to pass through the charging orifice and fill the lubricator. The relative positions of the various parts will then be thus shown in Fig. 2. When the lubricator is filled, it will be noticed by an increase in the resistance to the charging operation; the plunger of the charging syringe is drawn back, and the resulting suction allows the ball 5 to move back on to its seat, and also causes the piston 12 to move up against the plug 14 which thus closes again the orifice 13 in the piston. The hood 7 can then be removed without the slightest loss of lubricant.

What I claim is:—

1. A device for use in filling lubricators comprising a cylinder adapted to be attached to the lubricator with its interior communicating with the interior of the lubricator, a supply pipe for the cylinder, a piston movably mounted in the cylinder, a passage for permitting the lubricant to pass by the piston, and means for normally closing said passage, whereby on lubricant being forced with pressure through the supply pipe into said cylinder, said piston will be forced away from the means normally closing the passage so as to allow the charged lubricant to pass through the passage and enter the lubricator.

2. A device for use in filling lubricators comprising a cylinder adapted to be attached to the lubricator with its interior communicating with the interior of the lubricator, a supply pipe for the cylinder, a piston movably mounted in the cylinder and provided with a passage for permitting the lubricant to pass the cylinder, and a plug located in the cylinder for normally closing said passage, whereby on semi-solid lubricant being forced with pressure through the supply pipe into the cylinder, said piston will be moved away from the plug so as to allow the charged lubricant to pass through the passage in said piston and enter the lubricator.

3. A device for use in filling lubricators comprising a hood having a supply pipe; a cylinder carried by the hood and provided with means for connecting the cylinder to the hood, the interior of the cylinder and the interior of the lubricator being in communication when the parts are connected, a piston movably mounted in said cylinder and provided with a centrally disposed passage, and a centrally disposed plug carried by the hood and normally closing the passage in the piston.

4. A device for use in filling lubricators comprising a cylinder member adapted to be detachably connected to the lubricator with its interior communicating with the interior of the lubricator, a plug carried by said cylinder member, a piston located in said cylinder and having an aperture normally closed by said plug, and a tubular supply member for the cylinder member extending at right angles to the cylinder member, whereby on lubricant being forced with pressure through the supply member into said cylinder member, said piston will be forced away from said plug so as to allow the charged lubricant to pass through the piston aperture and enter the lubricator.

In testimony whereof I have signed my name to this specification.

EMILE PIQUEREZ.

Witnesses:
   Jos. Christe,
   H. J. Stehlin.